Oct. 3, 1939.　　　　G. H. GARRISON　　　　2,174,876
AUTOMOBILE ACCESSORY
Filed Feb. 3, 1938
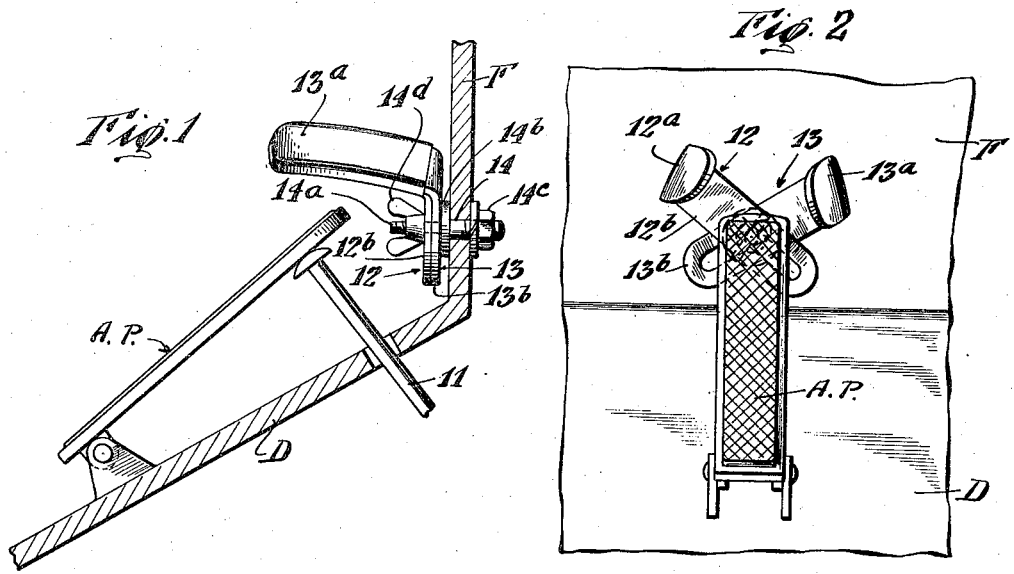
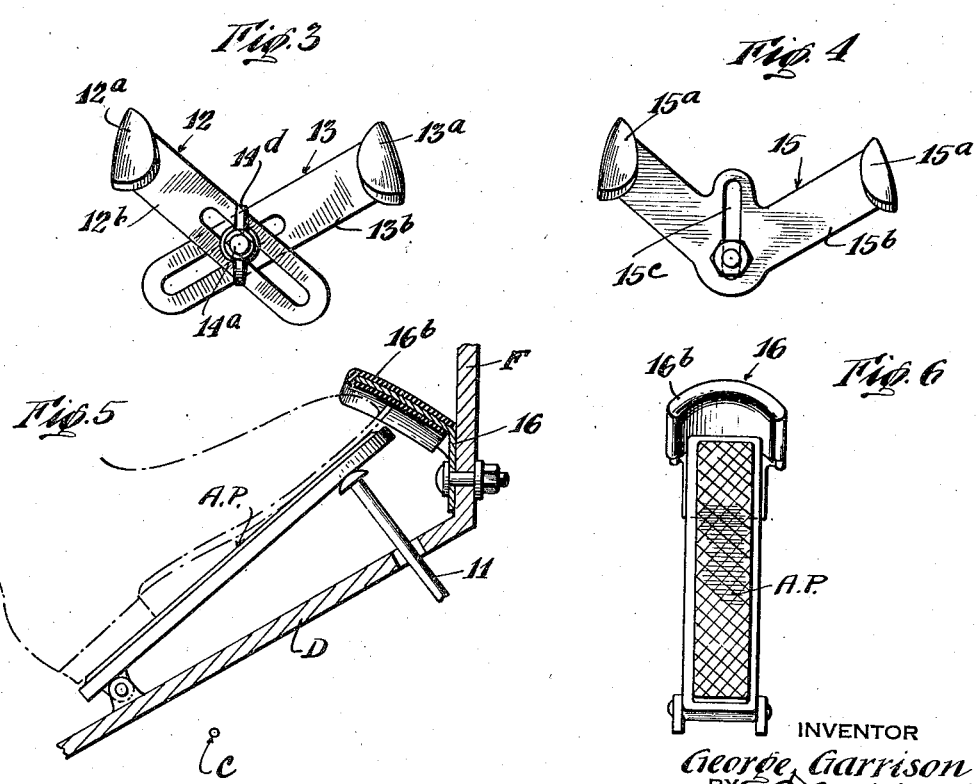
INVENTOR
George Garrison
BY
ATTORNEYS Patented Oct. 3, 1939

2,174,876

UNITED STATES PATENT OFFICE 2,174,876

AUTOMOBILE ACCESSORY

George H. Garrison, Delphi, Ind.

Application February 3, 1938, Serial No. 188,413

7 Claims. (Cl. 74—564)

This invention relates to automobile accessories and has for an object to provide means associated with the usual accelerator pedal cooperating with the shoe of the operator for facilitating operation of motor cars.

It is well known that when driving motor cars for long distances at fairly high speed the leg which is used to hold the accelerator pedal in depressed or partly depressed position becomes very tired. This is due to the fact that the accelerator pedal must be held down against the resistance of the accelerator pedal spring. These springs are frequently made quite strong and therefore cause particularly great fatigue.

Ratchet means and other holding devices for holding the accelerator pedal in depressed position have been proposed but such devices are impractical due to the difficulty of disengaging them in emergencies.

It is an object of the present invention to provide a simple and practical device which may be applied to various standard types of motor vehicles and which will cooperate with the shoe of the wearer to resist the reaction of the accelerator pedal spring in any position of adjustment of the pedal which may be desired.

A further object is to provide such a means against which the shoe of the operator is pressed, said means providing an abutment to receive the reaction of the accelerator pedal spring, said reaction being transmitted through the shoe.

A more specific object is to provide such a device cooperating with the sole only of the shoe of the operator.

Another object is to provide such an abutment means in duplicate, said means being so constructed and arranged that the shoe of the wearer is wedged therebetween.

A further object is to provide such a means in which the several parts are adjustable in relation to each other and to the accelerator pedal.

A more specific means is to provide such an abutment member or members overlaid with rubber or the like to prevent scuffing of the shoe.

The above and other objects will appear more clearly from the following description of an illustrative embodiment of the inventive idea and certain modifications thereof when taken in connection with the accompanying drawing in which:

Fig. 1 is a transverse view partly in section of one such illustrative form;

Fig. 2 is a view of the form shown in Fig. 1 viewed from the left of Fig. 1, viz., looking directly forwardly along a horizontal line;

Fig. 3 is an enlarged detailed view of part of the means shown in Figs. 1 and 2;

Fig. 4 is a view similar to Fig. 3 showing a modification of the abutment device shown in Figs. 1, 2, and 3;

Fig. 5 is a view similar to Fig. 1 showing a modified form; and

Fig. 6 is a view similar to Fig. 2 illustrating the device shown in Fig. 5.

Referring to said drawing, the letter D may be taken to represent the diagonal foot board of any standard car and letter F the usual more or less vertical extension thereof serving to form a wall between the engine compartment and the passenger space. AP represents the accelerator pedal of usual construction, serving to operate a rod or the like 11 connected to the throttle mechanism of the car, it being understood that the rod 11 or parts connected thereto are provided with spring means tending to push the accelerator pedal up to its normal position, which may be about as shown.

The numerals 12 and 13 indicate generally L-shaped members formed with the more or less rearwardly extending portions 12a and 13a which are arranged to converge somewhat as shown and which are preferably covered with rubber material. Said members 12 and 13 are also formed with portions 12b and 13b which, as shown, are slotted to receive a threaded extension 14a on a bolt member 14 formed with an enlarged portion 14b, held in position on the wall F by means of a nut 14c. The wing nut 14d serves as a convenient means for clamping the abutment members 12 and 13 into any desired position in accordance with the preferences of the user.

It will be seen that when the accelerator pedal is pressed downwardly, entirely or partly, and the foot slid upwardly, the shoe will be wedged between the accelerator pedal AP and the two abutment members 12a and 13a. Therefore the pedal may be held in that position for an indefinite period without causing fatigue since the muscles of the leg of the operator are not called upon to resist the action of the accelerator pedal spring.

A simpler form of construction is shown in Fig. 4 where instead of adjustable arms 12 and 13, a single member 15 is shown having upwardly extending arms 15a preferably also rubber covered. These arms are connected by an integral plate 15b which may be formed with either a round hole or a slot 15c for adjustably positioning the device relative to the car body.

In Figs. 5 and 6 a somewhat modified form is shown. The abutment in this case instead of consisting of two outwardly extending members between which the shoe sole is wedged consists of a single member cooperating with the toe portion of the shoe. As shown, this consists of an abutment device 16 preferably concave in cross-section, as shown, for the purpose of guiding the toe into proper relation therewith. The member 16 is also preferably slightly curved as viewed in a longitudinal vertical plane. The center of curvature thereof is preferably at a point, such as the point C (Fig. 5) so that outward motion of the pedal under the influence of its spring will serve to move the shoe in such a direction that the toe portion of its sole will tend to wedge against the abutment shoe 16. The inner surface of said abutment shoe 16 is preferably lined with rubber or the like 16b.

While I have herein shown and described only certain embodiments of certain features of my present invention it is to be understood that they are to be regarded merely as illustrative and that I do not intend to limit myself thereto except as may be required by the following claims.

I claim:

1. In a device of the type described, the combination of an accelerator pedal for a motor vehicle or the like provided with spring means for returning it to normal position, an abutment device mounted upon the vehicle adjacent said accelerator pedal, said device being so constructed, arranged, and located that a portion of the shoe of the operator may be wedged thereagainst in such a manner as to cause said shoe to transmit the reaction force of said spring to said abutment device, said abutment device comprising two converging members between which members and the accelerator pedal the shoe of the operator may be wedged.

2. In a device of the type described, the combination of an accelerator pedal for a motor vehicle or the like provided with spring means for returning it to normal position, an abutment device mounted upon the vehicle adjacent said accelerator pedal, said device being so constructed, arranged, and located that a portion of the shoe of the operator may be wedged thereagainst in such a manner as to cause said shoe to transmit the reaction force of said spring to said abutment device, said abutment device comprising two relatively adjustable members between which members and the accelerator pedal the shoe of the operator may be wedged.

3. A device in accordance with claim 1 in which said abutment device consists of a single integral member formed with two outwardly extending projections between which projections and the accelerator pedal the shoe of the operator may be wedged.

4. A device in accordance with claim 1 in which said abutment device consists of a single integral member formed with a single projecting element between which and the accelerator pedal the shoe of the operator may be wedged to hold the accelerator pedal in position.

5. A device of the type described for use in combination with an accelerator pedal of a motor vehicle or the like provided with spring means for returning it to normal position, said device being so constructed and arranged that when mounted in position adjacent the accelerator pedal a portion of the shoe of the operator may be wedged thereagainst in such a manner as to cause said shoe to transmit the reaction force of said spring to said abutment device, said abutment device comprising two converging members between which members and the accelerator pedal the shoe of the operator may be wedged.

6. A device of the type described for use in combination with an accelerator pedal of a motor vehicle or the like provided with spring means for returning it to normal position, said device being so constructed and arranged that when mounted in position adjacent the accelerator pedal a portion of the shoe of the operator may be wedged thereagainst in such a manner as to cause said shoe to transmit the reaction force of said spring to said abutment device, said abutment device comprising two relatively adjustable members between which members and the accelerator pedal the shoe of the operator may be wedged.

7. A device of the type described for use in combination with an accelerator pedal of a motor vehicle or the like provided with spring means for returning it to normal position, said device being so constructed and arranged that when mounted in position adjacent the accelerator pedal a portion of the shoe of the operator may be wedged thereagainst in such a manner as to cause said shoe to transmit the reaction force of said spring to said abutment device, said abutment device comprising two generally L-shaped members each having one arm thereof slotted, said slotted arms being crossed and adjustably held in place by a fastening member passing through said slots, and the other arm of each said member extending outwardly and being engageable by the shoe of the operator.

GEORGE H. GARRISON.